US006374126B1

(12) United States Patent
MacDonald, Jr. et al.

(10) Patent No.: US 6,374,126 B1
(45) Date of Patent: Apr. 16, 2002

(54) HANDS-FREE HEADSET WITH STOWABLE STEREO EARPIECE

(75) Inventors: James D. MacDonald, Jr., Apex; Seung Kil Kim, Chapel Hill; Michael Slayton, Wake Forest, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/437,612

(22) Filed: Nov. 10, 1999

(51) Int. Cl.[7] .................................................. H04M 1/02
(52) U.S. Cl. ....................... 455/569; 455/575; 381/309; 381/374; 381/375
(58) Field of Search ....................... 455/569, 90, 550, 455/575, 344, 74; 381/309, 370, 371, 372, 373, 374, 375; 379/430

(56) References Cited

U.S. PATENT DOCUMENTS

| | | | | |
|---|---|---|---|---|
| 4,621,372 A | * | 11/1986 | Relyea ........................ 455/74 |
| 4,634,816 A | * | 1/1987 | O'Malley et al. ............ 379/430 |
| 5,845,197 A | * | 12/1998 | Hada et al. .................... 455/90 |
| 5,978,689 A | * | 11/1999 | Tuoriniemi et al. ......... 455/569 |
| 6,272,362 B1 | * | 8/2001 | Wang .......................... 455/569 |

* cited by examiner

*Primary Examiner*—Lee Nguyen
(74) *Attorney, Agent, or Firm*—Myers Bigel Sibley & Sajovec, P.A.

(57) ABSTRACT

A hands-free headset includes first and second earpieces and is configured such that the second earpiece is integrally mounted to and stowed against the first earpiece during mono-communications operation or during storage. The headset includes two retractable cords which engage with a portable communications device. A sliding grommet attached to the retractable cords controls the separation of the cords and facilitates the two cords being reeled into a common cord reel. The headset also includes a switch which directs the desired electrical path to either stereo listening or communications operation. The headset further includes a docking platform which can be attached to the body of the portable communications device for storage and which holds the integral mounted earpieces against the cord storage reel for an aesthetic stowed hands-free device.

37 Claims, 7 Drawing Sheets

HANDS-FREE HEADSET WITH STOWABLE STEREO EARPIECE

FIELD OF THE INVENTION

The present invention relates generally to headsets and more particularly to headsets for mobile telephones.

BACKGROUND OF THE INVENTION

Hands-free communication is desirable for many mobile telephone users because a user can operate the mobile telephone (to speak or listen) without requiring the use of his or her hands. Stated differently, hands-free communication is attractive because it frees up the user's hands by not requiring a user to hold the unit in position such that the speaker and microphone of the telephone is located near his or her ear and mouth during a telephone conversation.

Conventionally, various headsets have been proposed which allow a user to operate the telephone in a "hands-free" mode. Typically, such headsets are after-market accessory items that can include long, relatively cumbersome electrical cords. Another disadvantage often associated with many of these headsets is that the user must manipulate the long cord and keep or store the unit (such as in a storage bag). In addition, this type of headset can be separated from the unit during periods of non-use and thus its accessibility at a particular demand time can be limited. Further, many of the conventional headsets are as large or larger than the newer miniaturized compact mobile telephones themselves. This can be undesirable to consumers who prefer more compact telephones and accessories. The bulky size of the headset can also make storage with the compact mobile telephone somewhat more difficult.

In many instances, it is also desired that the headsets accommodate stereo listening as well as wireless communication operation. Comparing the operation of the two modes, only a single earpiece is needed for the wireless communication mode, while two earpieces are used for a stereo listening mode. Conventionally, the stereo capability has been provided by a loose two-piece stereo earpiece configuration. Unfortunately, these configurations can be relatively cumbersome and typically include hanging wires and/or loose storage for one or both of the two earpieces.

OBJECTS AND SUMMARY OF THE INVENTION

It is therefore an object of the present invention to provide an improved compact stereo and communications headset which can be used both with a single (monaural) and dual ear-input.

It is another object of the present invention to provide a combination stereo/monaural headset for use with radiotelephones.

It is also an object of the present invention to provide an improved aesthetic hands-free communication headset which is configured to allow a user to easily change between a communications or stereo listening mode.

It is an additional object of the present invention to provide a hands-free communications headset with adjustable earpiece forms.

It is another object of the present invention to allow for integrated storage of the stereo earpiece during periods of non-use.

It is an additional object of the present invention to configure a compact mobile telephone headset such that it facilitates storage and improves user accessibility for the stereo earpiece portion of the headset.

These and other objects of the present invention are satisfied by the present invention, which is directed to a hands-free headset which is configured to releasably hold both the mono and stereo earpieces together in fixed integrated relationship during storage and communications-only use and allow for the separation of the stereo earpiece from the headset during stereo listening. The headset also includes or is operably associated with a user-engageable switch to direct the operation of the headset to the communications earpiece during a communications mode, thereby allowing electrical interruption of the stereo mode without requiring the removal the stereo earpiece.

More particularly, a first aspect of the present invention is a hands-free headset having stereo listening and monaural-communications operational modes for a mobile or portable communications device. The device comprises a primary headset body which includes a first earpiece configured to be in intimate contact with a first ear of a user during operation and a first speaker positioned proximate to the first earpiece. The primary headset body also includes a microphone positioned such that it is spaced-apart from the first earpiece and a first retractable cord operably associated with the speaker and microphone. The first cord is configured to electrically engage with a portable communications device. The primary headset body has an associated first communications path and a second stereo electrical path. The first communications electrical path comprises the speaker, the microphone, the first cord, and the communications device during communications operation of the headset. The second electrical path is different from the first and comprises the first speaker, the first cord, and the communications device during stereo listening operation of the headset. The hands-free headset also includes a secondary headset body configured to releasably attach to the primary headset body to provide an integrated primary and secondary body headset. The secondary headset body comprises a second earpiece configured to be in intimate contact with a second ear of a user during operation and a second speaker positioned proximate to the second earpiece. The secondary headset body also includes a second retractable cord operably associated with the second speaker. The second cord is configured to electrically engage with a portable communications device, and during the stereo operational mode the second electrical path further comprises the second speaker such that the first and second earpieces are configured to provide a stereo listening output to the user. The headset further includes a switch operably associated with the headset for selecting the first or second electrical path of the headset thereby activating the stereo or monaural-communications operational mode of the headset.

In a preferred embodiment, the switch comprises at least one of an electronic switch whereby the operation mode is automatically selected corresponding to detection of an incoming or outgoing signal, or one that operates on voice recognition of a spoken selected operational mode whereby the operation is selected via user direction. Alternatively or additionally, the switch can be a hardwired electrical switch configured such that it is readily externally accessible for physical activation by a user during operation when in position on a user.

It is also preferred that the headset include a sliding member which is slidably attached to both the first and second cords such that, in operation, the sliding member slides downwardly along the first and second cords to allow the first and second cords to separate away from each other.

It is additionally preferred that the primary headset body include a receptacle sized and configured to matably receive a portion of the second earpiece therein in a releasably engageable manner and that the primary and secondary headset bodies have a flexible neck portion positioned adjacent the respective earpieces. The flexible neck portions provide conformal adjustment for the earpieces of the headset.

Another aspect of the present invention, similar to the first aspect, is a hands-free headset configured to provide both stereo listening capability and a mono-communications operational mode for a mobile communications device. The headset comprises a first earpiece member comprising a first speaker and a first cord configured to engage with a portable communications device and a microphone in spaced apart relationship with the first speaker. The microphone is operably associated with the first speaker and the first cord. The first earpiece member is configured to be in intimate contact with a first ear of a user during operation and the first earpiece member has an associated electrical communication path which includes the speaker, the microphone, the cord, and the communications device during communications operation of the headset. The headset also includes a second earpiece member comprising a second speaker and a second cord. The second earpiece member is configured to releasably attach to the first earpiece member during periods of non-use. The second earpiece is configured to be in intimate contact with the second ear of a user, and during the stereo operational mode, the first and second earpiece members are configured to provide a stereo listening output.

In a preferred embodiment, the headset also includes at least one sliding member attached to the first and second cords, wherein the at least one sliding member is configured to slidably advance and retract along a portion of the length of the first and second cords.

It is also preferred that the headset include a switch operably associated with the first speaker for directing the electrical path of the headset corresponding to the selection of the stereo or monaural-communications operational mode of the headset. The stereo electrical path comprises the first and second speakers and the first and second cords, and the communications path comprises the first speaker and microphone and the first cord (and excludes the second speaker).

The present invention is advantageous because it provides a monaural/stereo headset with a compact aesthetic body which is easy to use. Further, the headset allows a user to conveniently switch between stereo and communications use without removing the earpieces from the ears. The switch can be activated in response to a call-waiting signal sent during stereo mode or other switching activation means. In addition, the headset configuration provides for convenient storage of the headset and cords during periods of non-use.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, certain layers or elements or regions may be exaggerated for clarity.

Figure 1:
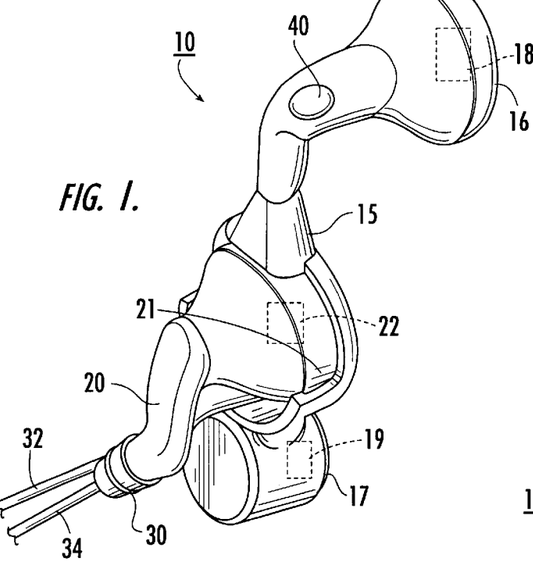
FIG. 1 is a side perspective view of a headset according to the present invention.

Referring now to FIG. 1, a preferred embodiment of a hands-free headset 10 according to the present invention is shown. As shown, the headset 10 includes a primary headset body 15 and a secondary headset body 20. As is also shown, the secondary headset body 20 is configured to be attached to the primary headset body 15 to define an integrated headset 10 during monaural use or periods of non-use (storage).

Figure 6:
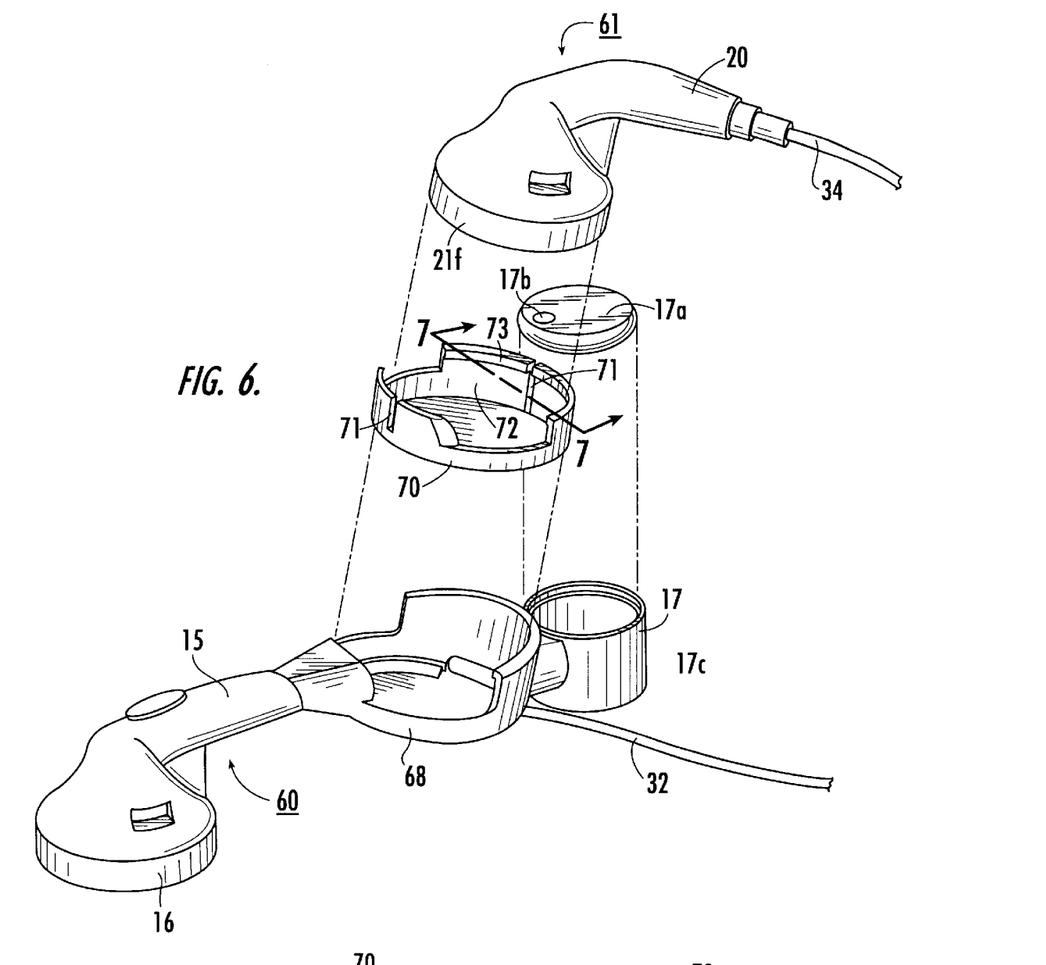
FIG. 6 is an exploded diagram of the headset illustrated in FIG. 1.
Figure 7:
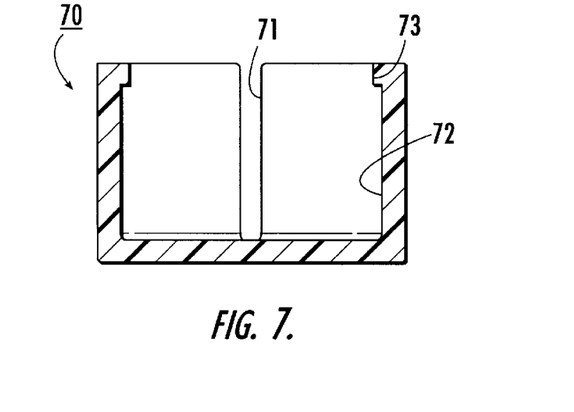
FIG. 7 is a section view of the receptacle of the headset taken along line 7—7 in FIG. 6.

The primary headset body 15 has a first earpiece 16 which is operably associated with a proximately positioned speaker 18, and a microphone housing 17 which is spaced apart from the speaker 18. The microphone housing 17 holds the microphone 19 therein. The microphone housing can include a cover 17a for assembly ease with ports 17b and 17c for facilitating entry or passage of sound therein (FIG. 6). The secondary headset body 20 also includes an earpiece 21 and a speaker 22 positioned in the secondary headset body 20 proximate to the earpiece 21.

Each of the primary and secondary headset bodies 15, 20 includes an electrical cord 32, 34 respectively, operably associated therewith. The electrical cords 32, 34 provide the electrical connection to and from a portable communications device (such as that illustrated by element 50 in FIG. 5) and the stereo output, i.e., to the speakers 16, 21 in the corresponding earpieces or the communications output/input to the speaker 16 and microphone 19. As used herein, the term "portable communications device" includes devices which incorporate a stereo music output which can include radio, compact disk, tape, DVD or other audio listening source as well as one or more of a radiotelephone, a cellular or digital telephone, a personal computing device, or paging device. In a preferred embodiment, the portable communications device includes at least a radiotelephone and a FM radio source.

Figure 2:
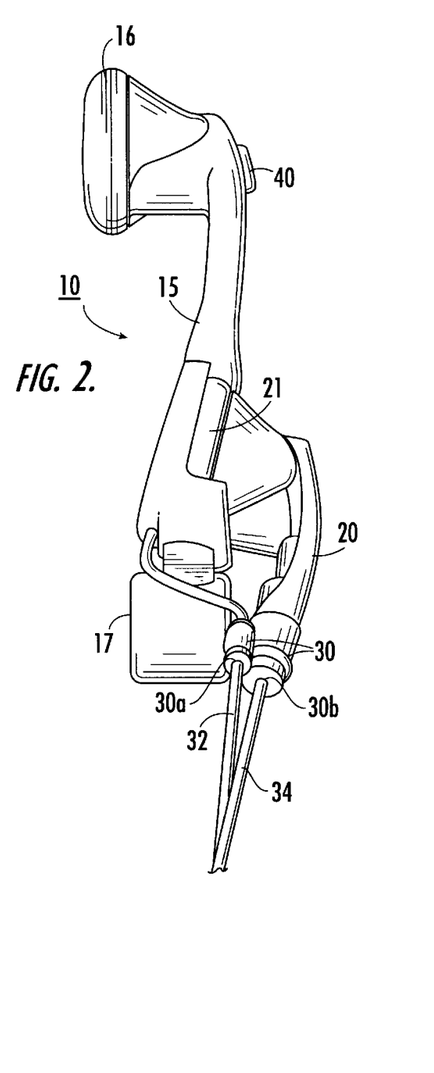
FIG. 2 is a side view of the headset illustrated in FIG. 1.
Figure 3:
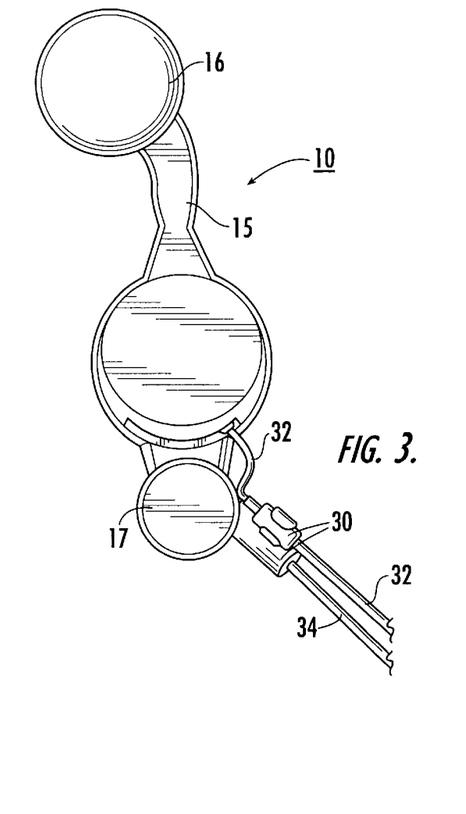
FIG. 3 is a front view of the headset shown in FIG. 1.
Figure 4:
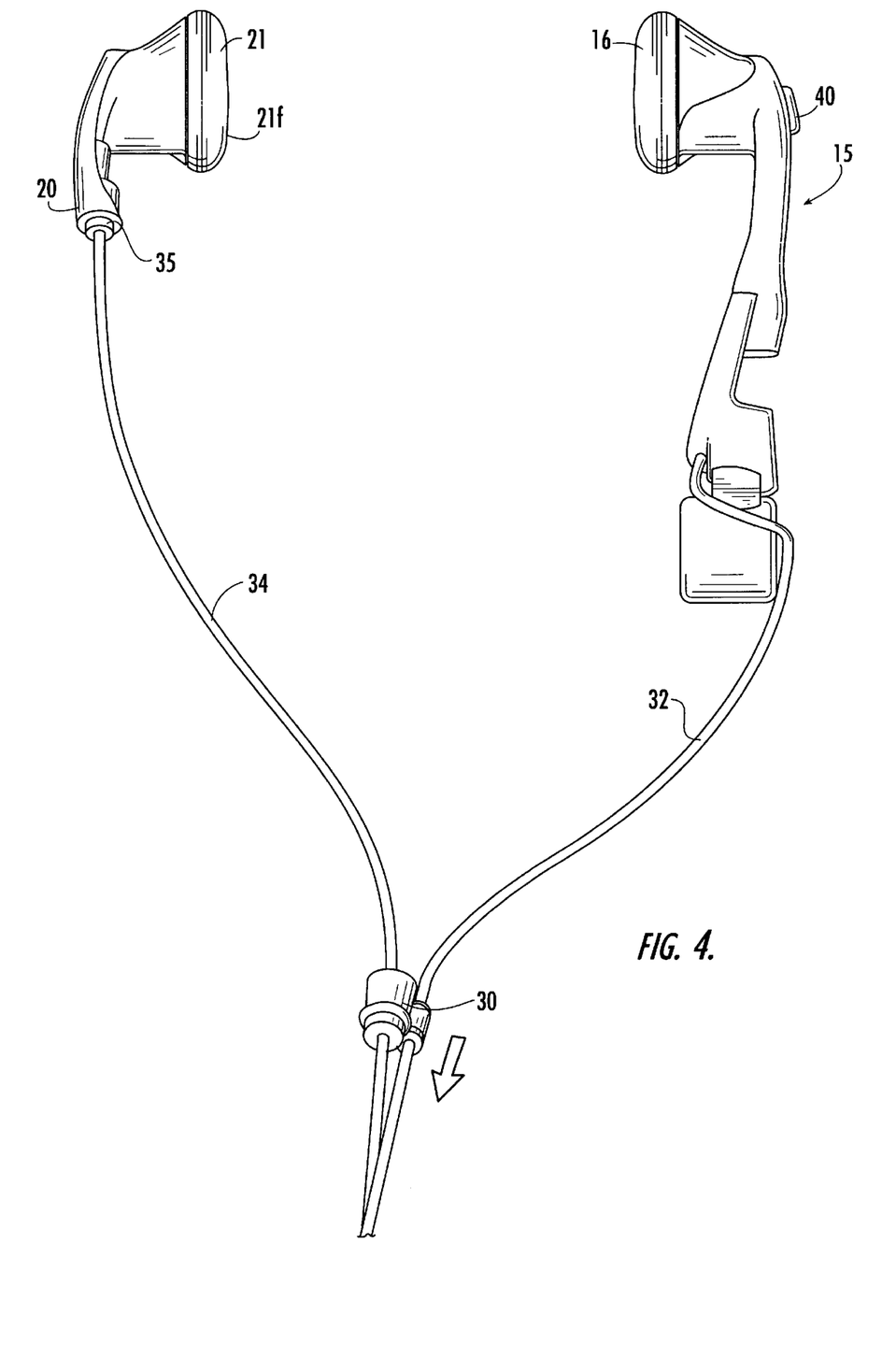
FIG. 4 is a front view of the headset of FIG. 1, illustrating the two earpieces separated and positioned for insertion into the ears of a user.

The headset 10 also preferably includes a sliding member 30 which is configured to slidably advance and retract about the first and second cords 32, 34. That is, when the secondary headset body 20 is stowed against the primary headset body 15, such as is shown in FIGS. 1–3, the sliding member 30 is advanced responsive to a user's physical adjustment to rest against a stop 35 (FIG. 4) or the lower portion of the primary or secondary headset bodies 15, 20. In contrast, during stereo applications as shown in FIG. 4, the sliding member 30 is slid along the cords 32, 34 and retracted or directed away from the primary and secondary headset bodies 15, 20 to allow the respective cords 32, 34 to separate away from each other. Preferably, the sliding member 30 is formed of a molded elastomer and is configured with cylindrical openings 30a, 30b which are sized to snugly receive said first and second cords 32, 34 therethrough such that the sliding member 30 moves in response to a user's input but maintains its selected position in the presence of gravitational forces alone.

Although the sliding member 30 is shown in FIG. 2 as a unitary body having two openings 30a, 30b, it can be alternately configured. For example, the single sliding member 30 can actually be two separate sliding members which are joined together when the secondary headset body 20 is stowed against the primary headset body 15 (not shown). Alternatively, in lieu of a sliding member, a substantially fixed cord latching member can be employed to lock the first and second cords 32, 34 together about a lower portion of the primary or secondary headset bodies 15, 20 (during monaural use or storage) (also not shown).

As shown, the headset 10 is preferably configured to be an "in-the-ear" device (ITE) wherein the earpiece sits in the ear of a user. Of course, other earpiece and corresponding headset support structures such as an "over-the-ear" (OTE) configuration or "behind-the-ear" (BTE) configuration can also be employed. In addition, the primary headset body 15 and secondary headset body 20 are interchangeable and can be used according to a user's preference.

FIG. 4 illustrates the first and second headset bodies 15, 20 separated and ready to be placed in operative position on a user. Thus, in position, the headset 10 of the instant invention allows a user to enjoy a dual aural input such as for FM stereo listening. As shown in FIGS. 1 and 4, the primary headset body 15 preferably also includes a switch or other switching means 40 which allows the user to select or switch between the stereo or monaural communications mode. Thus, in operation, a user can choose to use the headset only for monaural communication and thus leave the primary and secondary headset bodies 15, 20 attached together. Alternatively, the user can enjoy stereo listening and switch to the communications mode (with the two earpieces still in position) at a desired subsequent point in time.

Figure 5:
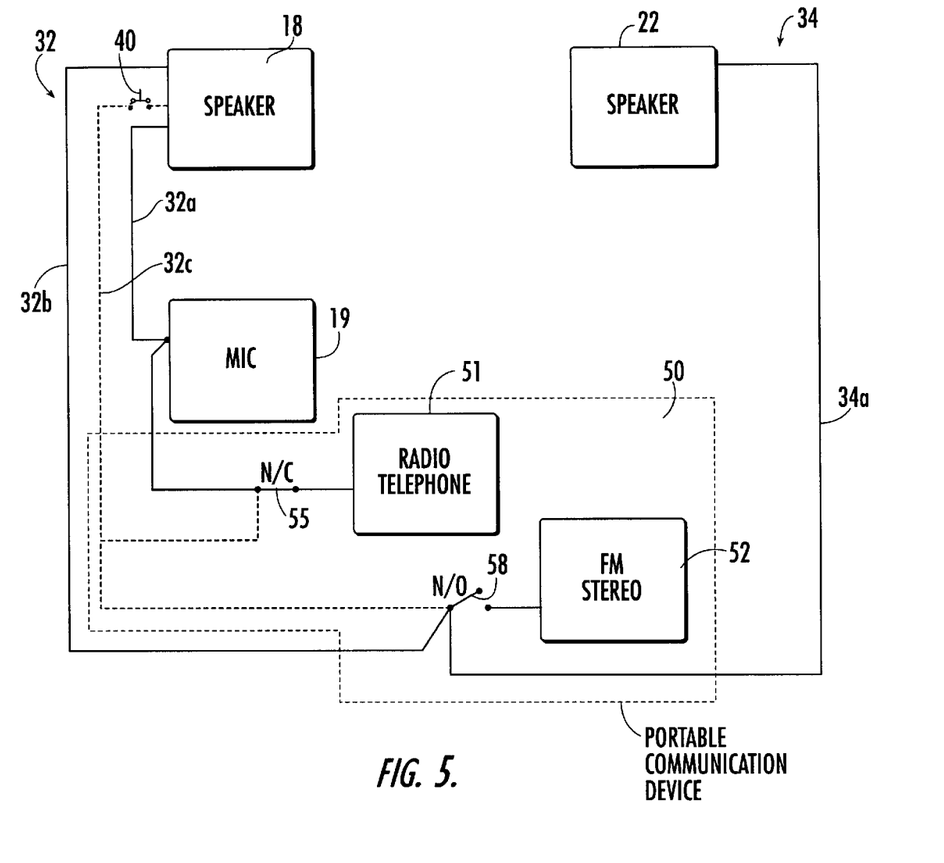
FIG. 5 is a schematic diagram of a switchable operation of the headset of FIG. 1 between a stereo listening mode and a communications mode according to the present invention.

Generally described, the headset 10 comprises two different electrical operational paths: one for the stereo mode and one for the communications mode. As such, the headset cords 32, 34 are electrically engageable (either via hardwiring or a releasable connector) to be interconnected to at least one input/output port associated with the portable communications device 50. FIG. 5 illustrates one example of an electrical circuit for the two modes. The primary headset body 15 and its associated first cord 32 preferably includes at least two operational signal paths and three electric lines. The first electric signal line 32a extends between the speaker 18 and the microphone 19 and the radiotelephone input/output in the portable communications device 50 for the communications/monaural mode. A second electrical signal line 32b extends directly from the speaker 18 (and does not include the microphone) into the portable communications device 50 for a FM stereo input source 52. A third electrical line 32c (which may include further or additional line or lines) can be directed from the switch 40 to one or more of the two input sources (either directly or via intermediate circuitry). Of course, the headset 10 and/or the portable communications device 50 can employ numerous alternative wiring or electrical paths or circuits to provide the electrical communications path and switching means for the two modes. For example, the switch 40 can be wired to connect to both the first and second signal lines 32a, 32b as well as the secondary headset body and associated signal line 34a at a location along the respective electrical lines.

As shown in FIG. 5, the third electrical line 32c extends from the switch 40 to both the radiotelephone 51 input/output (transmission and receive) and the FM stereo input source 52. As is also shown, the secondary headset body 20 and second cord 34 have an associated electrical signal line which extends from the speaker 22 to the portable communications device 50 at the stereo input source 52. In the embodiment shown, the depressible switch 40 is connected to the input sources within the portable communications device 50 via one normally closed switch 55 and one normally open switch 58.

In operation, the switch 40 is not activated, and the primary headset body 15 is configured such that the speaker 18 and microphone 19 are electrically active and connected to the radiotelephone for communications operation. Upon activation of the switch 40, the normally open switch 58 closes and the normally closed switch 55 opens, thereby engaging the second electrical path corresponding to the stereo operations mode. Of course, the separate connections shown in FIG. 5 into the portable communications device 50 can be provided by a single connector or a plurality of connectors.

Further, the electrical paths are not limited to the embodiment described. Indeed, as noted above, any number of alternate circuit and electrical wiring and paths can be employed, including configuring the secondary headset body 20 with a separate, additional, or in concert switching means, or having electrical line(s) and/or switch and switching means within the portable communications device itself 50 or via the headset (such as at the primary headset body 15) in order to provide the desired switchable operational configurations. Similarly, the signal processing or directional-decision making path of the headset can include operational circuits with alternate components such as microprocessors or other IC or analog components to provide the switching and selection of the desired operational modes.

Preferably, the electrical lines for the stereo input 34a, 32b to the speakers 22, 18, respectively, from the FM stereo output source 52 are provided as coaxial cables to provide suitable signal shielding. Similarly, the electrical connection or line 32b for the speaker 18 to microphone 19 to telephone 51 is also preferably provided by a coaxial cable. The two signal electrical lines for the primary headset body 32a, 32b may be combined within a common coaxial outer surface (ground), or may be provided as two separate coaxial lines. The switch line 32c can be provided as a separate electrical line within the cable bundle but preferably external to the coaxial line(s). Thus, the cords 32, 34 both include shielded signals with the respective signal portions in the first cord sharing a common coaxial ground.

Preferably, the primary headset and secondary headset bodies 15, 20 include respective flexible neck portions 60, 61. That is, the user can bend, shape, or form the neck portions 60, 61 for a more customized and comfortable configuration or fit to better align with the user's face or ear.

Figure 8:
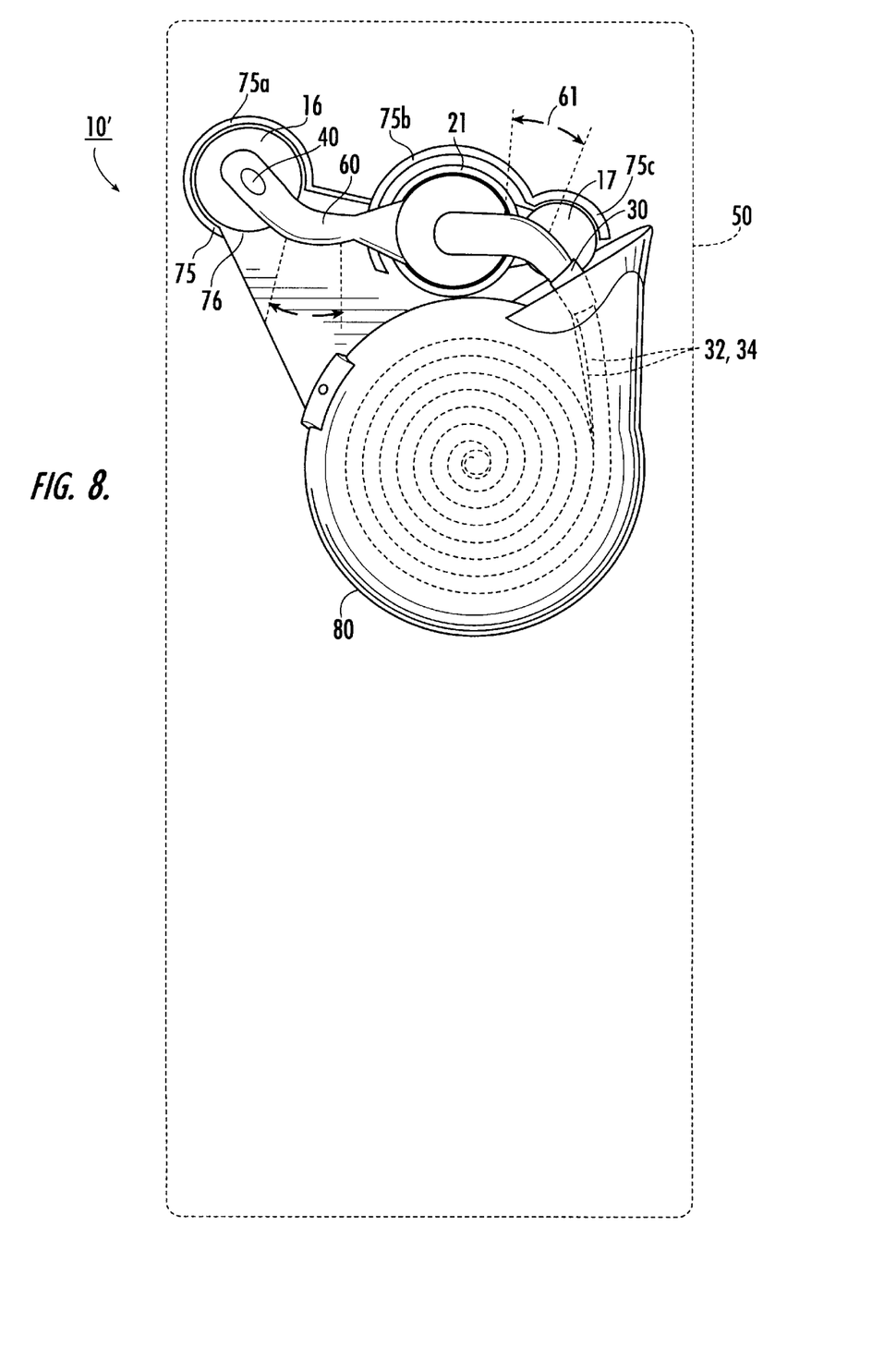
FIG. 8 is a front view of the headset of FIG. 1 showing the headset stored against a docking platform and the cords wound against a cord storage reel according to the present invention.

Further, this allows the earpieces 16, 21 to be interchangeable between left and right ears according to user preference. FIG. 8 illustrates the preferred minimum length of the flexible neck portions (indicated by the arrows between the dashed lines). As the underlying neck structure includes a portion of the coaxial cable, it is preferred that the underlying coaxial cable be formed of flexible coaxial cable materials. For example, a coaxial cable having a soft aluminum braided outer shell or spiral wrapped cable with an overmolded (preferably a low durometer thermoplastic) elastomer can provide such a flexible form adjustment feature which is durable and conformable.

The switching means 40 described above and shown in the figures is generally indicated as an electrical switch which is positioned to be accessible to a user. Preferably, the switch is configured such that it is positioned proximate the primary headset body earpiece 16 and easily activated either in a hands-free manner or in a relatively easily depressible switch. However, it will be appreciated by one of skill in the art that the switching means can be alternately configured and, if such an electrical switch (mechanical, membrane, or the like) 40 is employed, the switch can be alternatively located along the body of the headset 10. Alternatively, the switch 40 or switching means can also be located on or in the portable communications device 50. Preferably, as is shown, the switch 40 is depressible and positioned on one of the headset bodies 15, 20 such that it is easily accessible and easily activated by a user.

The switching between the stereo or communications mode can be made either automatically (or semi-automatically) or manually. The switching can also be made in response to a call waiting alert or other signal (vibrating or other audio) output by the portable communications device. That is, the switching means can be implemented via software or hardware or a combination of software and hardware to provide automatic or semiautomatic and/or user friendly prompts on the detection of an incoming call. For example, in response to detection of an incoming call or message, a signal can be transmitted from the portable communications device 50 and output to the stereo speaker (s) 16, 21 allowing a user to activate the switch and change the operational electrical path. Alternatively, in response to detection of an incoming call or a voice recognition (spoken directive, such as "telephone" or "stereo"), a microprocessor can activate the appropriate electrical path (not shown). Suitable voice recognition methods and devices are well known to those of skill in the art.

Turning now to FIG. 6, a preferred mounting configuration for attaching/securing the secondary headset body 20 to the primary headset body 15 is shown. As illustrated, the primary headset body 15 includes a receptacle 68 and an insert 70 which are sized and configured to hold a portion of the secondary headset body 20 therein. Preferably, as shown, the receptacle 68 is cylindrically sized and configured to hold the front portion of the second earpiece 21f therein. The insert 70 is preferably an expandable molded elastomeric insert which is configured to abut the front portion of the second earpiece when the second earpiece 21 is stowed therein. Suitable moldable materials are thermoplastic elastomers, such as "Santoprene®" (a trademark of Advanced Elastomer Systems, Inc.)

The insert 70 is sized and configured with at least one, and preferably, a series of circumferentially spaced apart slots 71 which extend along the depth direction into the cylindrically shaped receptacle insert 70. The slot 71 can extend a portion of the distance into the insert, or, preferably, as shown, the slots 71 extend substantially the entire depth of the insert.

The insert 70 also preferably includes an inwardly extending ridge portion 73 along a portion of its upper edge.

In operation, the secondary headset body earpiece 21 enters the insert 70 which expands to widen the width of the slot 71 and releasably engages with the primary headset body 15. Preferably, the receptacle insert 70 separates to hold the secondary headset body 20 against the primary headset body 15 by the contact with the wall 72 of the cylindrical portion and/or the insert ridge or rim portions 73 to thereby secure the secondary headset body 20 to the primary headset body 15. In reverse, a user can pull the second earpiece 16 away from the primary headset body 15 to cause the release of the second earpiece 21 from the receptacle 68. Upon release of the second earpiece 21, the walls 72 recover their original linear and unexpanded configuration.

Figure 9:
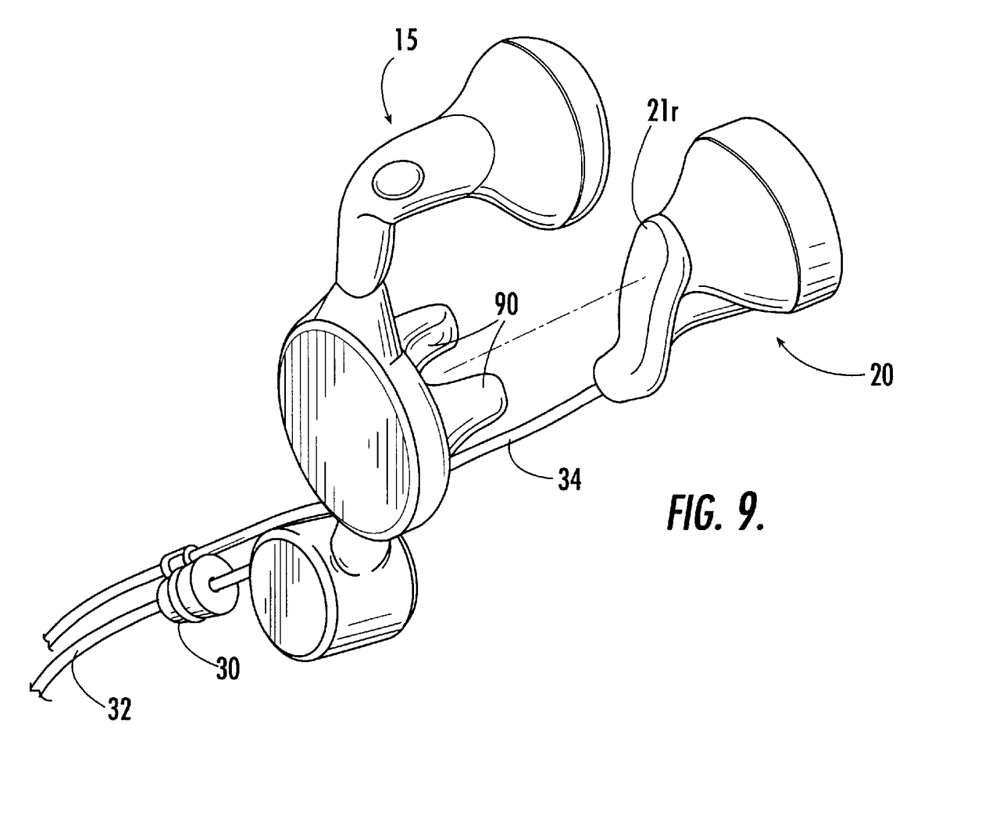
FIG. 9 is a side perspective view of an alternative embodiment of a headset according to the present invention.
Figure 10:
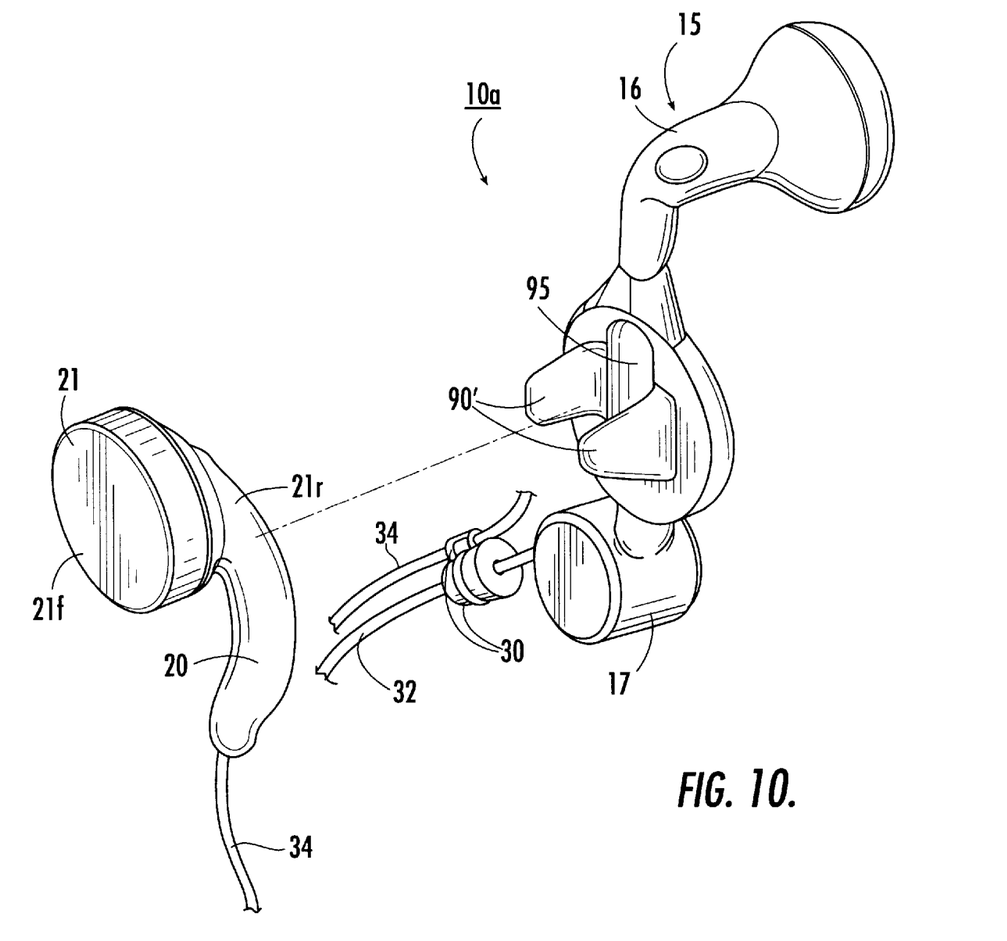
FIG. 10 is a side perspective view of yet another alternative embodiment of a headset according to the present invention.

Of course, other mounting configurations can be employed to allow releasable engagement of the secondary headset body 20 with the primary headset body 15 such that together the bodies form an integral body during monaural use while also allowing separation during stereo use. For example, as shown in FIG. 9, the primary headset body 15 can include a clasping means such as outwardly extending fingers 90 configured and sized to hold the secondary headset body 20 such that the rear 21r of the second earpiece 21 is held against the primary headset body 15 with the earpiece 21 facing the ear of the user (when in the stowed integrated position on the primary headset body). Another alternative mounting arrangement is shown in FIG. 10. In this embodiment, a groove or cutout portion 95 is preferably formed in the primary headset body 15 and a pair of fingers 90' (similar to those shown in FIG. 9) are used to secure the secondary headset body 20 against the primary headset body 15. The groove 95 helps reduce the size, protrusion, or extension of the profile of the second earpiece 21 away from the primary headset body during stowage. In this configuration, the second earpiece 21 faces away from the user (the rear 21r of the earpiece 21 faces the user) when in position on a user and in monaural operation.

In any event, the headset 10 is preferably sized and configured as a compact miniaturized design. Typically, the earpieces 16, 21 are circularly shaped with about a 15–16 mm diameter. Thus, the receptacle insert 70 with the earpiece 21 seated therein has an outer diameter of about 19 mm. The length of the integrated headset 10 measured from the center of the first earpiece 15 to the center of the microphone housing 17 is about 40–50 mm, and more preferably about 45 mm. Preferably, the overall length of the headset 10 (the length measured from the top to bottom of the headset when the primary and headset bodies are mounted together, i.e., the top of the first earpiece 16 to the bottom of the microphone housing 17) is under about 70 mm and is more preferably about 65 mm. Of course, the invention is not limited to, as the length can vary and the shapes of the circular earpieces and receptacles can vary as other shapes and sizes of earpieces as well as the shape of an associated stowage receptacle or mating segment or components can also be employed as contemplated by the instant invention.

FIG. 8 illustrates a preferred embodiment of a stowable integrated dual mode headset 10' according to the present invention. In this embodiment, the headset assembly 10' includes a docking platform 75 and an uptake cord reel 80. Preferably, the cord reel 80 is spring loaded and configured to uptake both the first and second cords 32, 34 side by side therein. In operation, the cord reel 80 includes a release lever (not shown) which when activated allows the cores to extend therefrom or retract back therein. As such the cords 32, 34 are retractable to store in an uncluttered manner. Suitable cord reels are configured similar to cord reels available from Hoseiden as well known to those of skill in the art.

The docking platform 75 is preferably configured with an external profile which aligns with the contour of the perimeter of the integrated headset. As shown, the docking platform 75 includes a substantially planar base 76 and three arcuately shaped outwardly extending rim portions 75a, 75b, 75c, for holding the corresponding portions of the headset thereagainst, i.e., the first and second earpieces 16, 21 and microphone housing 17 during storage or non-use periods. The tension of the cords 32, 34 in the spring-loaded reel helps hold the headset securely against the docking platform 75 with the grommet or sliding member 30 providing a stop to for the headset to resist entry into the cord reel 80. Thus, a user can grasp the neck portion intermediate the first and second earpieces 16, 21, and remove the headset (pull away) from the docking platform 75 for use. The headset assembly 10' with the cord reel 80 and docking platform 75 can be formed to be integral to the portable communications device 50 with hardwired electrical connections. Alternatively, the headset assembly 10' with the cord reel 80 can be configured as an accessory plug in to be attached only upon the user's inclination. In addition, the docking platform 75 can be formed directly into the portable communications device or other structural component rather than onto the cord reel 80 as shown.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A hands-free headset for a mobile communications device having stereo listening and mono-communications operational modes, comprising:

a primary headset body comprising:
        a first earpiece configured to be in intimate contact with a first ear of a user during operation;
        a first speaker positioned proximate to said first earpiece;
        a microphone positioned such that it is spaced apart from said first earpiece; and
        a first retractable cord operably associated with said speaker and microphone, said first cord configured to electrically engage with a portable communications device,
        wherein said primary headset body has a first communications electrical path which comprises said speaker, said microphone, said first cord, and the communications device during communications operation of said headset, and a second different stereo listening electrical path which comprises said first speaker, said first cord, and said communications device during stereo listening operation of said headset; and a secondary headset body configured to releasably attach to said primary headset body to provide an integrated primary and secondary body headset, said secondary headset body comprising:
        a second earpiece configured to be in intimate contact with a second ear of a user during operation;
        a second speaker positioned proximate to said second earpiece; and
        a second retractable cord operably associated with said second speaker,
        wherein said second cord is configured to electrically engage with a portable communications device, and wherein during the stereo operational mode said second electrical path further comprises said second speaker such that said first and second earpieces are configured to provide a stereo listening output to the user; and a switch operably associated with said headset for selecting the first or second electrical path of the headset thereby activating the stereo or mono-communications operational mode of the headset.

2. A headset according to claim 1, wherein said switch comprises at least an electronic switch whereby the operation mode is automatically selected corresponding to detection of an incoming or outgoing signal.

3. A headset according to claim 1, wherein said switch is responsive to voice recognition of a spoken selected operational mode whereby the operation is selected via a user's spoken direction.

4. A headset according to claim 1, wherein said switch is a hardwired electrical switch configured such that it is readily externally accessible for physical activation by a user during operation in position on a user.

5. A headset according to claim 1, further comprising a sliding member slidably attached to both said first and second cords such that, in operation, said sliding member slides downwardly along said first and second cords to allow said first and second cords to separate away from each other.

6. A headset according to claim 1, further comprising a sliding member and an uptake cord storage reel, wherein said sliding member is slidably attached to both said first and second retractable cords to allow said first and second cords to retract in concert against said storage reel.

7. A headset according to claim 6, wherein said headset further comprises a docking platform configured to hold said first and second earpieces together adjacent said storage reel during periods of non-use.

8. A headset according to claim 7, wherein said headset is configured to mechanically attach to a mobile communications device for storage.

9. A headset according to claim 1, wherein, in position, said primary headset body has opposing first and second end portions and opposing inwardly and outwardly facing external perimeter surfaces, and wherein said secondary headset body is configured to attach to a portion of said outwardly facing external perimeter surface of said primary headset body.

10. A headset according to claim 9, wherein said primary headset body includes a receptacle sized and configured to matably receive a portion of said second earpiece therein in a releasably engageable manner.

11. A headset according to claim 1, wherein said primary headset body has a flexible conformal neck portion adjacent said first earpiece, and wherein said secondary headset body has a flexible conformal neck portion adjacent said second earpiece.

12. A headset according to claim 11, wherein said primary headset body includes a receptacle sized and configured to matably receive at least a portion of said second earpiece therein, wherein said receptacle is positioned intermediate said first earpiece and said microphone.

13. A headset according to claim 12, wherein said receptacle is substantially cylindrically shaped and has a length which defines the receptacle depth, and wherein said receptacle is configured with at least one linear separation slot extending along at least a portion of the depth direction of said receptacle which is configured to allow said receptacle to expand responsive to entry of said second earpiece portion into said receptacle to thereby provide secure engagement therewith.

14. A headset according to claim 13, wherein said at least one slot is a plurality of slots circumferentially spaced-apart about the perimeter of said receptacle.

15. A hands-free headset according to claim 12, wherein when said headset primary headset body has a length which is less than about 65 mm.

16. A headset according to claim 1, wherein said primary headset body further comprises sound apertures positioned proximate to said microphone.

17. A hands-free headset according to claim 1, in combination with a mobile communications device having a wireless communication mode and an FM stereo listening mode, wherein said first and second cords are in electrical communication therewith.

18. A hands-free headset according to claim 17, wherein said mobile communications device comprises a wireless telephone.

19. A hands-free headset configured to provide both stereo listening capability and a mono-communications operational mode for a mobile communications device, comprising:
a first earpiece member comprising a first speaker and a first cord configured to engage with a portable communications device;
a microphone in spaced apart relationship with said first speaker, said microphone operably associated with said first speaker and said first cord, wherein said first earpiece member is configured to be in intimate contact with a first ear of a user during operation, said first earpiece member having an associated electrical communication path which includes said speaker, said microphone, said cord, and the communications device during communications operation of said headset; and
a second earpiece member comprising a second speaker and a second cord, said second earpiece member being configured to releasably attach to said first earpiece member during periods of non-use, wherein said second earpiece is configured to be in intimate contact with the second ear of a user, and wherein during the stereo operational mode said first and second earpiece members are configured to provide a stereo listening output.

20. A hands-free headset according to claim 19, further comprising at least one sliding member attached to said first and second cords, wherein said at least one sliding member is configured to slidably advance and retract along a portion of the length of said first and second cords.

21. A hands-free headset according to claim 20, further comprising a switch operably associated with said first speaker for directing the electrical path of said headset corresponding to the selection of the stereo or mono-communications operational mode of the headset, wherein a stereo electrical path comprises said first and second speakers, and said first and second cords, and wherein the communications path comprises said first speaker and microphone and said first cord.

22. A headset according to claim 21, wherein said switch is configured as an electrical switch mounted such that it is readily externally accessible for physical activation by a user during operation in position on a user.

23. A headset according to claim 20, wherein said sliding member is configured with two separate openings, one for each of said first and second cords, and is sized and configured such that, in operation, said sliding member slides downwardly along said first and second cords to allow said first and second cords to separate.

24. A hands-free headset according to claim 19, further comprising a retractable cord storage reel configured to receive said first and second cords for storage.

25. A headset according to claim 24, said headset further comprising a docking platform configured to hold said first and second earpiece members together adjacent said storage reel during periods of non-use.

26. A headset according to claim 25, wherein said headset is configured to mechanically attach to the mobile communications device for storage.

27. A headset according to claim 19, further comprising an uptake cord storage reel, a sliding member and first and second retractable cords to allow said first and second cords to retract in concert against said storage reel.

28. A headset according to claim 19, wherein each of said first and second earpiece members include ear-contacting earpieces, and wherein, during periods of non-stereo use, said first and second earpiece members are integrally mounted together such that said second earpiece member is supported by said first earpiece member, and wherein when mounted together, both said first and second earpieces are oriented to face the ear of a user and said second earpiece is positioned such that it is longitudinally spaced apart from said first earpiece.

29. A headset according to claim 28, wherein said first earpiece member includes a receptacle sized and configured to matably receive a portion of said second earpiece member therein in a releasably engageable manner.

30. A headset according to claim 19, wherein said first and second earpiece members are configured with a flexible neck portion to thereby allow a user to adjust the fit of same.

31. A headset according to claim 19, wherein said first earpiece member includes a receptacle sized and configured to matably receive at least a portion of said second earpiece member therein, wherein said receptacle is positioned intermediate said first speaker and said spaced apart microphone.

32. A headset according to claim 31, wherein said receptacle is substantially cylindrically shaped and has a length which defines the receptacle depth, and wherein said receptacle is configured with at least one linear separation slot extending along at least a portion of said receptacle in the depth direction which is configured to allow said receptacle to expand responsive to entry of said second earpiece portion into said receptacle to thereby provide secure engagement therewith.

33. A headset according to claim 32, wherein said at least one slot is a plurality of slots circumferentially spaced-apart about the perimeter of said receptacle.

34. A hands-free headset according to claim 19, in combination with the mobile communications device having a wireless communication mode and an FM stereo listening mode, wherein said first and second cords are in electrical communication therewith.

35. A hands-free headset according to claim 34, wherein said mobile communications device comprises a wireless telephone.

36. A hands-free headset according to claim 21, wherein said switch is a call answer button which can be activated in response to a call waiting alert transmitted through at least one of said first and second speakers in the stereo listening mode.

37. A hands-free headset configured to provide both stereo listening capability and a mono-communications operational mode for a mobile communications device, comprising:

- a first earpiece member comprising a first speaker and a first cord configured to engage with a portable communications device, said first earpiece member having a receptacle formed therein;
- a microphone in spaced apart relationship with said first speaker, said microphone operably associated with said first speaker and said first cord, wherein said first earpiece member is configured to be in intimate contact with a first ear of a user during operation, said first earpiece member having an associated electrical communication path which includes said speaker, said microphone, said cord, and the communications device during communications operation of said headset;
- a second earpiece member comprising a second speaker and a second cord, said second earpiece member having opposing front and rear surfaces, said front surface configured to enter into said receptacle and releasably attach to said first earpiece member during periods of non-use, wherein said second earpiece is configured to be in intimate contact with the second ear of a user, and wherein during the stereo operational mode said first and second earpiece members are configured to provide a stereo listening output;
- at least one sliding member attached to said first and second cords, wherein said at least one sliding member is configured to slidably advance and retract along a portion of the length of said first and second cords;
- a switch operably associated with said first speaker for directing the electrical path of said headset corresponding to the selection of the stereo or mono-communications operational mode of the headset, wherein the stereo electrical path comprises said first and second speakers, and said first and second cords, and wherein the communications path comprises said first speaker and microphone and said first cord; and
- a retractable cord storage reel configured to receive said first and second cords for storage.

\* \* \* \* \*